(12) United States Patent
Kelly et al.

(10) Patent No.: US 10,047,854 B2
(45) Date of Patent: Aug. 14, 2018

(54) VEHICLE SPEED CONTROL SYSTEM AND METHOD

(71) Applicant: Jaguar Land Rover Limited, Whitley, Coventry, Warwickshire (GB)

(72) Inventors: James Kelly, Solihull (GB); Navid Shamshiri, Coventry (GB); Edward Rycroft, Southam (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 373 days.

(21) Appl. No.: 14/910,694

(22) PCT Filed: Aug. 6, 2014

(86) PCT No.: PCT/EP2014/066884
§ 371 (c)(1),
(2) Date: Feb. 6, 2016

(87) PCT Pub. No.: WO2015/018857
PCT Pub. Date: Feb. 12, 2015

(65) Prior Publication Data
US 2016/0200323 A1 Jul. 14, 2016

(30) Foreign Application Priority Data
Aug. 7, 2013 (GB) .................................. 1314152.8

(51) Int. Cl.
*F16H 61/02* (2006.01)
*B60W 10/11* (2012.01)
(Continued)

(52) U.S. Cl.
CPC ......... *F16H 61/0213* (2013.01); *B60K 35/00* (2013.01); *B60K 37/02* (2013.01);
(Continued)

(58) Field of Classification Search
None
See application file for complete search history.

(56) References Cited

U.S. PATENT DOCUMENTS 4,300,652 A 11/1981 Redzinski et al.
4,769,774 A 8/1988 Narita et al.
(Continued)

FOREIGN PATENT DOCUMENTS

CA 2386267 A1 * 11/2002 ......... F16H 61/0246
DE 102007012788 A1 9/2008
(Continued)

OTHER PUBLICATIONS

Combined Search and Examination Report corresponding to application No. GB1314152.8, dated Feb. 18, 2014, 6 pages.
(Continued)

*Primary Examiner* — Dirk Wright
(74) *Attorney, Agent, or Firm* — Reising Ethington P.C.

(57) ABSTRACT

Embodiments of the present invention provide a vehicle speed control system operable to cause a vehicle to operate in accordance with a target speed value, the system being operable automatically to perform a direction change operation wherein the system causes a transmission of the vehicle to adopt a configuration corresponding to travel in an opposite direction to the instant configuration when the vehicle speed does not exceed a prescribed transmission direction change speed.

24 Claims, 7 Drawing Sheets

(51) Int. Cl.
*B60W 30/18* (2012.01)
*F16H 59/02* (2006.01)
*B60W 50/12* (2012.01)
*B60W 10/06* (2006.01)
*B60W 10/10* (2012.01)
*B60W 10/184* (2012.01)
*B60W 30/182* (2012.01)
*B60R 1/00* (2006.01)
*B60K 35/00* (2006.01)
*B60K 37/02* (2006.01)
*B60W 50/00* (2006.01)
*F16H 59/08* (2006.01)
*B60W 50/14* (2012.01)

(52) U.S. Cl.
CPC .............. *B60R 1/00* (2013.01); *B60W 10/06* (2013.01); *B60W 10/10* (2013.01); *B60W 10/11* (2013.01); *B60W 10/184* (2013.01); *B60W 30/182* (2013.01); *B60W 30/18045* (2013.01); *B60W 50/12* (2013.01); *F16H 59/02* (2013.01); *F16H 61/0204* (2013.01); *B60K 2350/1016* (2013.01); *B60K 2350/1072* (2013.01); *B60K 2350/928* (2013.01); *B60R 2300/80* (2013.01); *B60W 2050/0095* (2013.01); *B60W 2050/146* (2013.01); *B60W 2510/182* (2013.01); *B60W 2520/04* (2013.01); *B60W 2520/10* (2013.01); *B60W 2540/12* (2013.01); *B60W 2540/16* (2013.01); *B60W 2550/14* (2013.01); *B60W 2710/1005* (2013.01); *B60W 2710/182* (2013.01); *B60W 2720/10* (2013.01); *B60W 2720/403* (2013.01); *F16H 61/0246* (2013.01); *F16H 2059/0221* (2013.01); *F16H 2059/0247* (2013.01); *F16H 2059/088* (2013.01); *F16H 2061/0234* (2013.01); *F16H 2061/0244* (2013.01); *F16H 2312/08* (2013.01)

(56) References Cited

U.S. PATENT DOCUMENTS

| 5,875,680 | A | 3/1999 | Lorriette | |
|---|---|---|---|---|
| 6,019,202 | A | 2/2000 | Anwar | |
| 6,549,838 | B2 * | 4/2003 | O'Neil | B60W 10/06 123/41.05 |
| 6,910,988 | B2 * | 6/2005 | Carlsson | B60T 7/12 192/219 |
| 7,097,021 | B2 * | 8/2006 | Takamura | B60W 10/04 192/219 |
| 7,188,539 | B2 * | 3/2007 | Herbster | B60W 30/18045 74/335 |
| 7,267,634 | B2 * | 9/2007 | Nakagawa | B60W 10/02 477/172 |
| 8,239,107 | B2 | 8/2012 | Mair | |
| 8,262,540 | B2 * | 9/2012 | Higaki | B60W 10/06 477/109 |
| 9,187,096 | B2 * | 11/2015 | Neelakantan | F16H 61/0246 |
| 2003/0116399 | A1 | 6/2003 | Tietze | |
| 2004/0166989 | A1 | 8/2004 | Carlsson | |
| 2004/0180753 | A1 | 9/2004 | Takamura et al. | |
| 2005/0227810 | A1 | 10/2005 | Nakagawa et al. | |
| 2009/0093340 | A1 | 4/2009 | Higaki et al. | |

FOREIGN PATENT DOCUMENTS

| DE | 102009053267 A1 | 5/2011 | |
|---|---|---|---|
| EP | 0821188 A1 | 1/1998 | |
| WO | WO-9412813 A1 * | 6/1994 | ......... F16H 61/0246 |
| WO | WO-2005022006 A1 * | 3/2005 | ......... F16H 61/0246 |
| WO | WO-2012148320 A1 * | 11/2012 | ............ B60W 10/02 |

OTHER PUBLICATIONS

International Search Report corresponding to International application No. PCT/EP2014/066884, dated Oct. 13, 2014, 6 pages.
Written Opinion corresponding to International application No. PCT/EP2014/066884, dated Oct. 13, 2014, 9 pages.
Combined Search and Examination Report corresponding to application No. GB1413892.9, dated Jan. 26, 2015, 10 pages.
Further Search Report corresponding to application No. GB1413892.9, dated Jul. 22, 2015, 3 pages.

* cited by examiner

VEHICLE SPEED CONTROL SYSTEM AND METHOD

FIELD OF THE INVENTION

The invention relates to a system for controlling the speed of a vehicle. In particular, but not exclusively, the invention relates to a system for controlling the speed of a land-based vehicle which is capable of driving in a variety of different and extreme terrains and conditions.

The content of co-pending UK patent application no. GB2507622 and U.S. Pat. No. 7,349,776 are hereby incorporated by reference.

BACKGROUND

In known vehicle speed control systems, typically referred to as cruise control systems, the vehicle speed is maintained on-road once set by the user without further intervention by the user so as to improve the driving experience for the user by reducing workload.

With typical cruise control systems, the user selects a speed at which the vehicle is to be maintained, and the vehicle is maintained at that speed for as long as the user does not apply a brake or, in the case of a vehicle having a manual transmission, depress a clutch pedal. The cruise control system takes its speed signal from a driveshaft speed sensor or wheel speed sensors. When the brake or the clutch is depressed, the cruise control system is disabled so that the user can override the cruise control system to change the vehicle speed without resistance from the system. If the user depresses the accelerator pedal the vehicle speed will increase, but once the user removes his foot from the accelerator pedal the vehicle reverts to the pre-set cruise speed by coasting.

Such systems are usually operable only above a certain speed, typically around 15-20 kph, and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in circumstances in which a user may not consider it to be desirable to do so.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly, to maintain a safe following distance.

Known cruise control systems also cancel in the event that a wheel slip event is detected requiring intervention by a traction control system (TCS) or stability control system (SCS). Accordingly, they are not well suited to maintaining vehicle progress when driving in off road conditions where such events may be relatively common.

It is also known to provide a control system for a motor vehicle for controlling one or more vehicle subsystems. U.S. Pat. No. 7,349,776 discloses a vehicle control system comprising a plurality of subsystem controllers including an engine management system, a transmission controller, a steering controller, a brakes controller and a suspension controller. The subsystem controllers are each operable in a plurality of subsystem function modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the sub-systems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR)® System or controller. The driving modes may also be referred to as terrain modes, terrain response modes, or control modes.

SUMMARY OF THE INVENTION

Embodiments of the invention may be understood with reference to the appended claims.

Aspects of the present invention provide a system, a vehicle and a method.

In an aspect of the invention for which protection is sought there is provided a vehicle speed control system operable to cause a vehicle to operate in accordance with a target speed value, the system being operable automatically to perform a direction change operation wherein the system causes a speed of the vehicle to reduce to a value not exceeding a direction change speed limit value, being a maximum speed at which a transmission of the vehicle is permitted to adopt a configuration corresponding to travel in an opposite direction to the instant configuration, if the vehicle speed exceeds the direction change speed limit value when the direction change operation is commenced.

Embodiments of the present invention have the advantage that vehicle composure may be enhanced and driver workload reduced when a change of direction of travel of a vehicle is required. This is at least in part because the speed control system is operable automatically to reduce a speed of the vehicle to a value not exceeding the prescribed direction change speed limit value. Thus a driver is not required to intervene in vehicle speed control and cause a reduction in speed in order to facilitate the direction change. Rather, the driver may continue to concentrate on steering the vehicle whilst the speed control system manages vehicle speed automatically in order to enable the direction change operation to be performed.

The system may be further operable automatically to cause a transmission of the vehicle to adopt a configuration corresponding to travel in the opposite direction to the instant configuration when the speed has reduced to a value not exceeding the direction change speed limit value.

The system may be operable automatically to cause the vehicle to operate in accordance with a target speed value following a direction change operation.

Optionally the system is operable to cause the vehicle to operate in accordance with a forward direction target speed value when travelling in a forward direction and a reverse direction target speed value when travelling in a reverse direction opposite the forward direction.

The system may be configured wherein the forward direction target speed value is substantially equal to the reverse direction target speed value.

The system may be operable to limit the value of the reverse direction target speed value to a maximum reverse direction target speed value.

The system may be operable to cause the vehicle to operate in a forward direction in accordance with a target speed value that is greater than the maximum reverse direction target speed value.

In some embodiments the system may be configured to perform the direction change operation in response to a user input indicative that a direction change operation is required, for example by means of a dedicated 'direction change request' input control such as a softkey or hardware input means such as a hardware input button.

In addition or instead, the system may be operable to perform the direction change operation in response to user selection of a transmission mode corresponding to travel in an opposite direction.

Thus in some embodiments the user may command performance of a direction change operation by selecting a transmission mode corresponding to travel in the opposite direction to the currently selected transmission mode. Thus, if the vehicle is traveling in a forward direction in 'drive mode' (placarded 'D' in some vehicles) the system may cause the transmission to assume 'reverse mode' (placarded 'R' in some vehicles). Conversely, if the vehicle is travelling in the reverse direction in the 'reverse' mode, the system may cause the transmission to assume the 'drive' mode. Other arrangements are also useful.

The system may be operable to accelerate the vehicle from rest following a change in configuration of the transmission from travel in a first direction to travel in a second direction opposite the first at a moment selected in dependence at least in part on suspension system articulation.

The system may be operable to accelerate the vehicle from rest following a change in configuration of the transmission from travel in a first direction to travel in a second direction opposite the first when the suspension system of a newly trailing axle is in a configuration corresponding substantially to a maximum excursion of the vehicle body in a downward direction prior to acceleration from rest.

Thus, the system may detect when a suspension system of a newly trailing wheel (i.e. trailing with respect to travel in the second direction) has reached a limit of travel of the vehicle body in a downward direction with respect to the associated trailing wheel and to accelerate the vehicle from rest substantially at that time.

It is to be understood that when driving on certain driving surfaces, an amount of torque that may be applied to a wheel in order to accelerate the wheel before slip of the wheel occurs typically increases with the amount of force acting on the wheel in a direction towards the driving surface. When a vehicle slows to a halt and subsequently accelerates from rest, load transfer towards a leading axle which subsequently becomes a trailing axle takes place, causing articulation of the suspension system due to inertia of the vehicle body. Thus an increase in downward force acting on the leading wheels occurs as the vehicle slows (which wheels become trailing wheels following the direction change operation, i.e. newly trailing wheels). The amount of the downward force is typically a maximum when the amount of articulation of the suspension of the newly trailing wheels is a maximum in terms of movement of the vehicle body in a direction towards the newly trailing wheels.

By suspension system articulation is meant an amount by which the suspension system permits upwards or downwards motion of the vehicle body with respect to a rest position of the suspension system for a given vehicle loading, vehicle body roll angle and vehicle body pitch angle.

The system may be operable to perform a rock-away operation in which the system causes the vehicle repeatedly to perform the direction change operation.

Optionally, when the system is performing a rock-away operation, the system is operable automatically to perform a direction change operation in response to detection of a step in a driving surface.

This feature has the advantage that the system may automatically determine when the direction change operation is required during the course of a rock-away operation. This reduces a workload on the driver and may enable a less experienced driver successfully to negotiate difficult terrain.

The system may be operable to allow a user to command execution of a direction change operation by selecting a transmission operating mode corresponding to travel in an opposite direction to that of the instant transmission operating mode.

Upon the user making the selection, the system may be configured automatically to reduce the speed of travel to a speed not exceeding the direction change speed limit value.

In some embodiments the control system may be configured to bring the vehicle momentarily to a halt by means of coordinated control of a braking system and powertrain prior to completing the direction change of the vehicle.

In a further aspect of the invention for which protection is sought there is provided a vehicle comprising a system according to a preceding aspect.

In one aspect of the invention for which protection is sought there is provided a method of controlling a vehicle by means of a speed control system, comprising: causing a vehicle to operate in accordance with a target speed value; and automatically performing a direction change operation, whereby performing the direction change operation comprises causing a speed of the vehicle to reduce to a value not exceeding a direction change speed limit value, being a maximum speed at which a transmission of the vehicle is permitted to adopt a configuration corresponding to travel in an opposite direction to the instant configuration, if the vehicle speed exceeds the direction change speed limit value when the direction change operation is commenced.

It is to be understood that the vehicle may be operable to cause a vehicle to operate in accordance with a target speed value when a user activates the system.

Optionally, performing the direction change operation further comprises causing a transmission of the vehicle to adopt a configuration corresponding to travel in an opposite direction to the instant configuration when the vehicle speed does not exceed the direction change speed limit value.

Thus, in some embodiments the transmission may be caused automatically to adopt a gear corresponding to travel in the opposite direction when the direction change operation is performed. Thus if the transmission is operating in a forward gear, a reverse gear may be selected whilst if the transmission is operating in a reverse gear, a forward gear may be selected.

The system may be configured to apply a braking system to control vehicle speed to prevent vehicle speed from exceeding the direction change speed limit value whilst the direction change operation is in progress.

Thus it is to be understood that the system may be configured to ensure that vehicle speed does not exceed the direction change speed limit value until the direction change operation is complete.

In some embodiments the system may be configured to ensure that vehicle speed does not exceed the direction change speed limit value regardless of the direction of movement of the vehicle during the direction change operation. Thus, in the case that the vehicle is travelling downhill when the direction change operation is initiated, the system may be configured to ensure that vehicle speed does not exceed the direction change speed limit value in the downhill direction whilst the direction change operation is in progress.

In some embodiments the system may be configured to employ a braking system to prevent rollback once a gear corresponding to travel in the opposite direction has been selected. That is, the system may be configured to prevent movement of the vehicle in the direction opposite that corresponding to the direction of travel of the newly selected gear until the vehicle has commenced motion in the newly selected direction.

In some embodiments the system may be configured to cause the vehicle to come to rest by means of the braking system and subsequently to prevent rolling in a direction opposite the intended new direction of travel, by means of the braking system. The system may be configured to release the braking system once sufficient torque is being applied to one or more wheels by a powertrain and/or as a consequence of gravitation force to permit the vehicle to move in the newly selected direction without experiencing rolling in the opposite direction.

Thus the system may be configured to cause the vehicle to come to rest and remain at rest until the direction change operation is complete, and sufficient torque is being applied to one or more wheels by a powertrain and/or as a consequence of gravitation force to permit the vehicle to move in the newly selected direction without experiencing rollback.

In the case that the vehicle is travelling uphill when a direction change operation is initiated, the system may be configured to employ a braking system to prevent vehicle speed exceeding the direction change speed limit value in the new (downhill) direction of travel whilst the direction change operation is in progress.

In some embodiments the system may employ the braking system to prevent vehicle speed exceeding the prevailing target speed value in the new direction of travel. It is to be understood that, once the transmission of the vehicle is operating in a gear corresponding to the newly selected direction of travel, vehicle speed control may be performed by a combination of powertrain torque control and brake torque control. Thus the system may be deploy the braking system to control vehicle speed until the transmission is operating in the newly selected gear, after which speed control may be performed by control of one or both of powertrain torque and brake torque.

In some embodiments, the system may be configured to employ a low speed progress control system for controlling speed by controlling powertrain torque and braking in order to maintain a prescribed speed. Once a direction change operation is initiated, control of vehicle speed by the low speed progress control system may be suspended whilst the direction change operation is in progress, due to the fact that a powertrain torque interruption will typically occur when the selected transmission operating gear is changed from a forward gear to a reverse gear. During the period of suspension, vehicle speed is controlled by means of the braking system alone. The speed control system may control the braking system in order to allow vehicle speed to accelerate under gravity up to the target speed value in the newly selected direction of travel (if the newly selected direction of travel is downhill) or, if the newly selected direction of travel is uphill, hold the vehicle at a speed at or below the direction change speed limit value in the direction opposite the newly selected direction of travel until sufficient powertrain torque has been developed to propel the vehicle in the newly selected direction of travel. Thus the braking system may be controlled so as to prevent 'rollback' of the vehicle, i.e. rolling in the downhill direction opposite the newly selected direction of travel, whilst the direction change operation is in progress. It is to be understood that the low speed progress control system may be configured to accelerate the vehicle by application of powertrain torque once application of powertrain torque to one or more wheels has been restored following the direction change operation.

It is to be understood that in some embodiments the low speed progress control system may be configured to accelerate the vehicle from a substantially stationary condition and to control release of the braking system to allow the vehicle to progress in the newly selected (uphill) direction.

In an aspect of the invention for which protection is sought there is provided a vehicle speed control system operable to cause a vehicle to operate in accordance with a target speed value, the system being operable automatically to perform a direction change operation wherein the system causes a transmission of the vehicle to adopt a configuration corresponding to travel in an opposite direction to the instant configuration when the vehicle speed does not exceed a prescribed transmission direction change speed.

The speed control system may be further operable to slow the vehicle to a speed not exceeding the prescribed transmission direction change speed when the direction change operation is performed.

The system may be operable automatically to perform the direction change operation in response to a user input. The user input may be by means of a dedicated direction change operation input such as a softkey or hardware button or other control input. In some embodiments the system may perform the direction change operation in response to user selection of a transmission operating mode corresponding to travel in a direction opposite that corresponding to the instant transmission operation mode. By user selection is meant that a user commands the transmission to assume an operating mode corresponding to travel in a direction opposite that corresponding to the instant transmission operation mode, for example by means of a transmission operating mode selector such as a rotary selector dial, a joystick or other control input.

In one aspect of the invention for which protection is sought there is provided a method of controlling a vehicle by means of a speed control system, comprising: causing a vehicle to operate in accordance with a target speed value; and automatically performing a direction change operation, whereby performing the direction change operation comprises causing a transmission of the vehicle to adopt a configuration corresponding to travel in an opposite direction to the instant configuration when the vehicle speed does not exceed a prescribed direction change speed limit value.

The direction change operation may further comprise automatically slowing the vehicle to a speed not exceeding the prescribed transmission direction change speed when the direction change operation is performed.

In an aspect of the invention for which protection is sought there is provided a vehicle speed control system operable to cause a vehicle to operate in accordance with a target speed value, the system being operable automatically to perform a direction change operation wherein the system causes a transmission of the vehicle to adopt a configuration corresponding to travel in an opposite direction to the instant configuration, the system being operable to perform the operation subject to the condition that vehicle speed does not exceed a prescribed direction change speed limit value.

In another aspect of the invention for which protection is sought there is provided an electronic controller for a vehicle having a storage medium associated therewith storing instructions that when executed by the controller causes the control of the operation of a brake system of a vehicle in accordance with the method described hereinabove.

In a yet further aspect of the invention for which protection is sought there is provided A non-transitory, computer-readable storage medium storing instructions thereon that when executed by one or more electronic processors causes the one or more electronic processors to carry out the method described hereinabove.

Within the scope of this application it is envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

BRIEF DESCRIPTION OF THE DRAWINGS

The invention will now be described by way of example only with reference to the following figures in which.

DETAILED DESCRIPTION

References herein to a block such as a function block are to be understood to include reference to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

Figure 1:
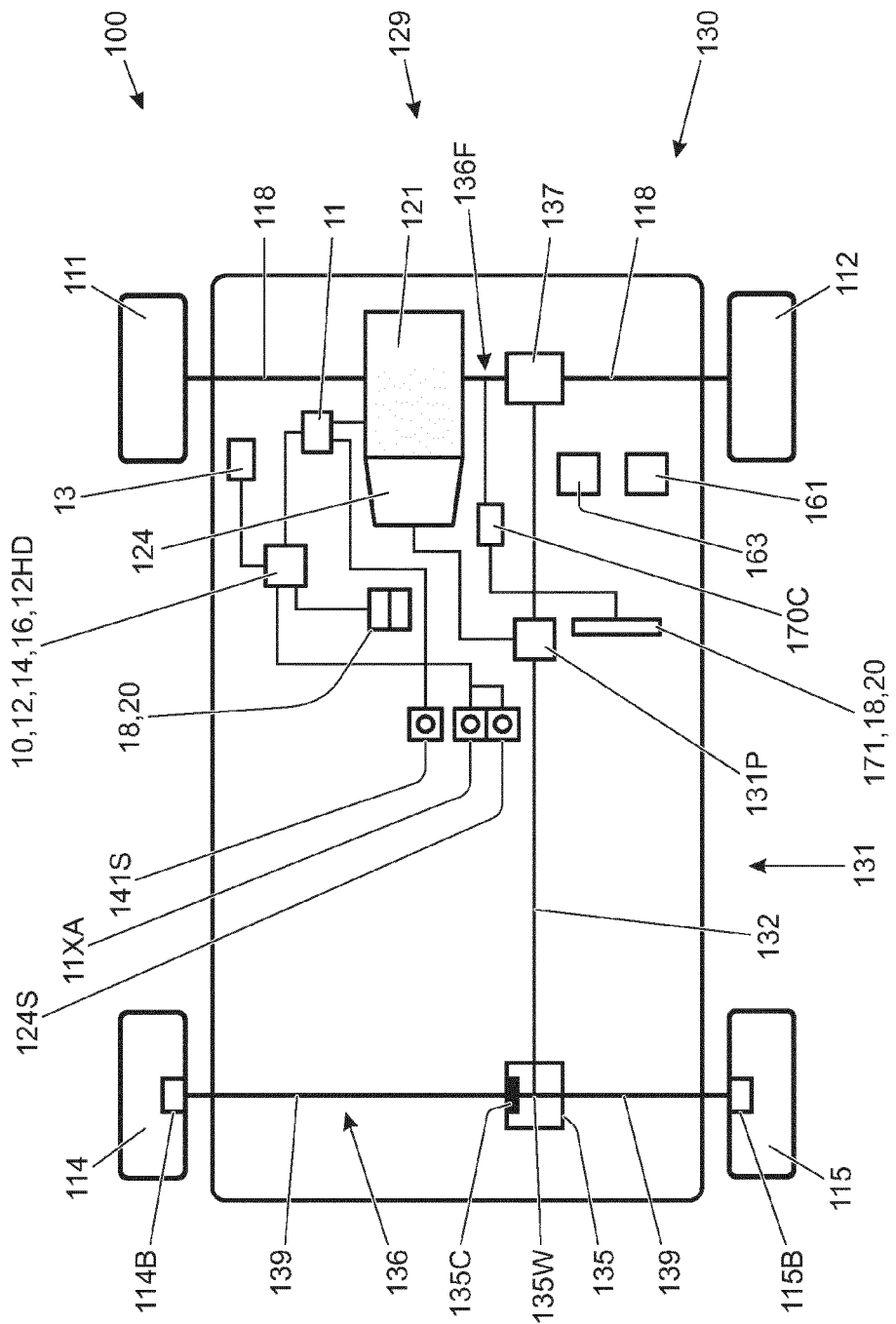
FIG. 1 is a schematic illustration of a vehicle according to an embodiment of the invention in plan view.
Figure 2:
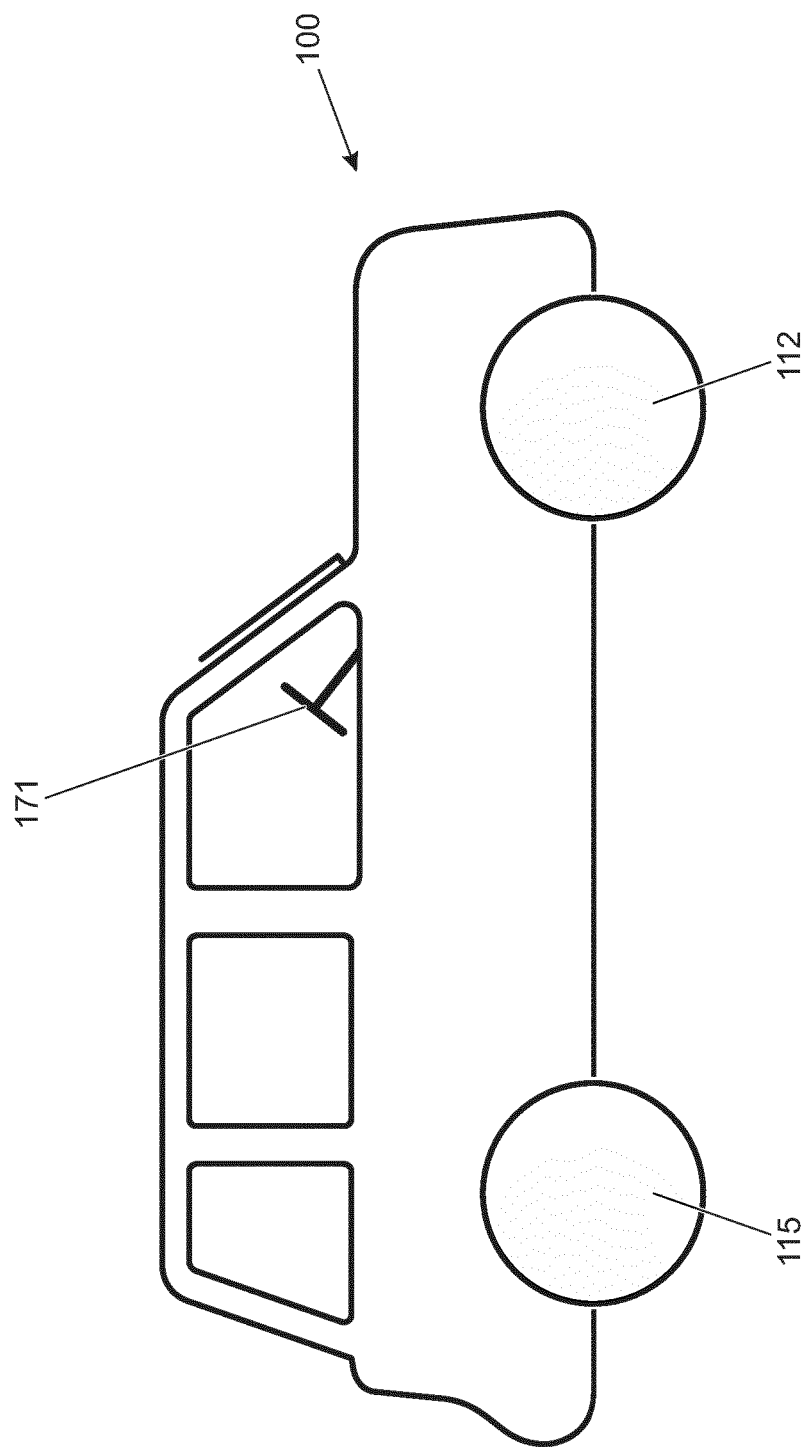
FIG. 2 shows the vehicle of FIG. 1 in side view.

FIG. 1 shows a vehicle 100 according to an embodiment of the present invention. The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139.

Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing operation in a two wheel drive mode or a four wheel drive mode. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
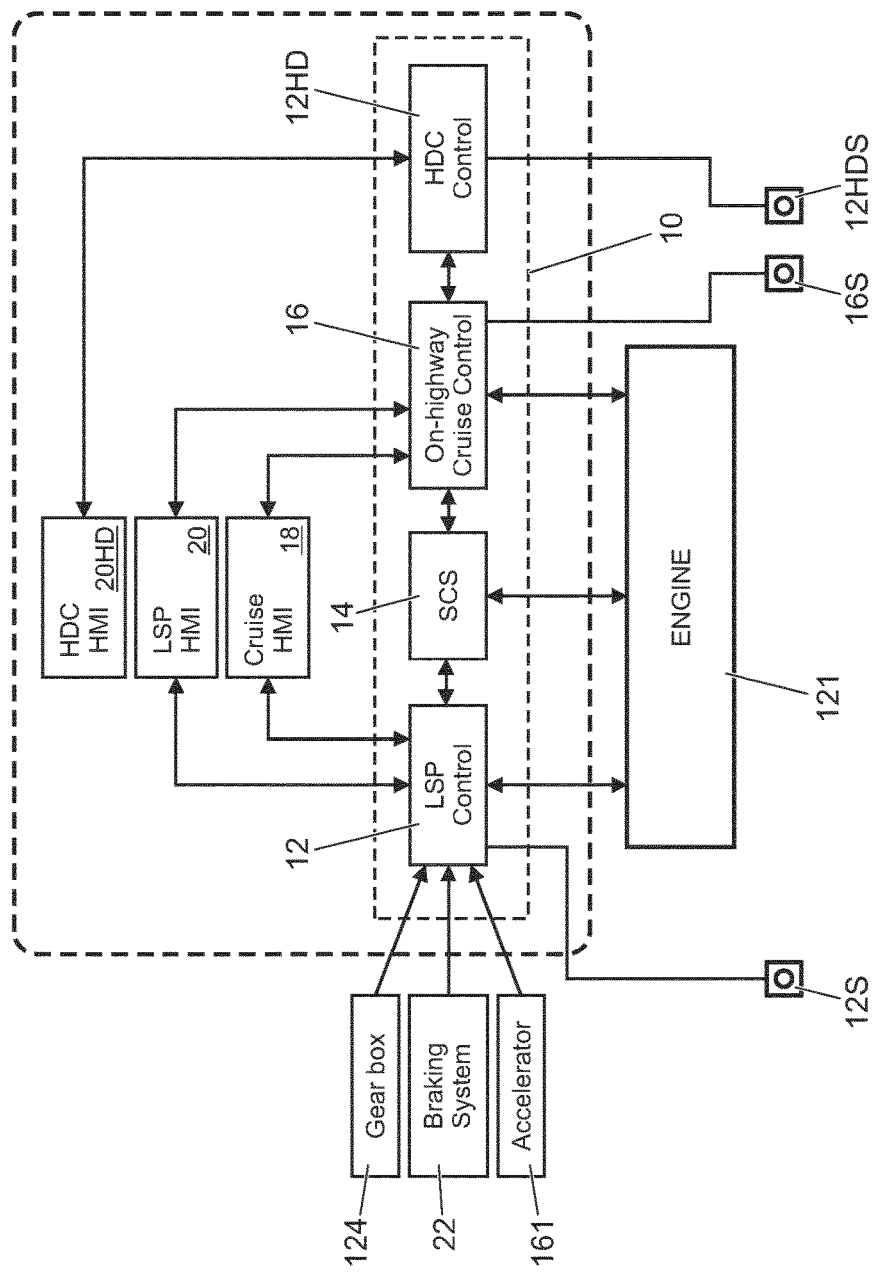
FIG. 3 is a high level schematic diagram of an embodiment of the vehicle speed control system of the present invention, including a cruise control system and a low-speed progress control system.

A control system for the vehicle engine 121 includes a central controller 10, referred to as a vehicle control unit (VCU) 10, a powertrain controller 11, a brake controller 13 and a steering controller 170C. The brake controller 13 forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3 and a stability control system (SCS) 14. The SCS 14 improves the safety of the vehicle 100 by detecting and managing loss of traction. When a reduction in traction or steering control is detected, the SCS 14 is operable automatically to command a brake controller 13 to apply one or more brakes of the vehicle to help to steer the vehicle 100 in the direction the user wishes to travel. In the embodiment shown the SCS 14 is implemented by the VCU 10. In some alternative embodiments the SCS 14 may be implemented by the brake controller 13. Further alternatively, the SCS 14 may be implemented by a separate controller.

Although not shown in detail in FIG. 3, the VCU 10 further includes a Dynamic Stability Control (DSC) function block, a Traction Control (TC) function block, an Anti-Lock Braking System (ABS) function block and a Hill Descent Control (HDC) function block. These function blocks are implemented in software code run by a computing device of the VCU 10 and provide outputs indicative of, for example, DSC activity, TC activity, ABS activity, brake interventions on individual wheels and engine torque requests from the VCU 10 to the engine 121 in the event a wheel slip event occurs. Each of the aforementioned events indicate that a wheel slip event has occurred. Other vehicle sub-systems such as a roll stability control system or the like may also be useful.

Figure 5:
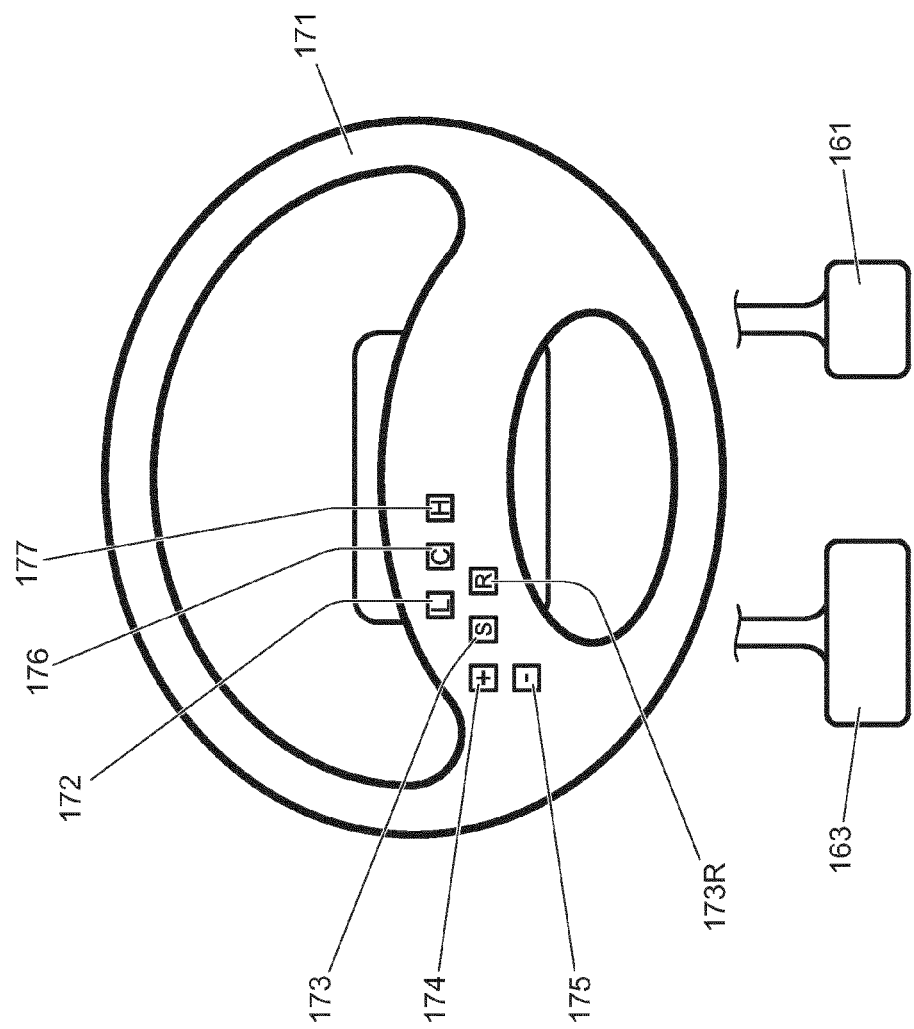
FIG. 5 illustrates a steering wheel and brake and accelerator pedals of a vehicle according to an embodiment of the present invention.

As noted above the vehicle 100 also includes a cruise control system 16 which is operable to automatically maintain vehicle speed at a selected speed when the vehicle is travelling at speeds in excess of 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 5). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following driver over-ride. It is to be understood that known on-highway cruise control systems including the present system 16 are configured so that, in the event that the user depresses the brake or, in the case of vehicles with a manual transmission, a clutch pedal, the cruise control function is cancelled and the vehicle 100 reverts to a manual mode of operation which requires accelerator pedal input by a user in order to maintain vehicle speed. In addition, detection of a wheel slip event, as may be initiated by a loss of traction, also has the effect of cancelling the cruise control function. Speed control by the system 16 is resumed if the driver subsequently depresses the resume button 173R.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI 18. In the present embodiment the cruise control system 16 is configured to allow the value of cruise_set-speed to be set to any value in the range 25-150 kph.

The LSP control system 12 also provides a speed-based control system for the user which enables the user to select a very low target speed at which the vehicle can progress without any pedal inputs being required by the user. Low-speed speed control (or progress control) functionality is not provided by the on-highway cruise control system 16 which operates only at speeds above 25 kph.

The LSP control system 12 is activated by means of a LSP control system selector button 172 mounted on the steering wheel 171. The system 12 is operable to apply selective powertrain, traction control and braking actions to one or more wheels of the vehicle 100, collectively or individually, to maintain the vehicle 100 at the desired speed.

The LSP control system 12 is configured to allow a user to input a desired value of set-speed parameter, LSP_set-speed to the LSP control system 12 via a low-speed progress control HMI (LSP HMI) 20 (FIG. 1, FIG. 3) which shares certain input buttons 173-175 with the cruise control system 16 and HDC control system 12HD. Provided the vehicle speed is within the allowable range of operation of the LSP control system (which is the range from 2 to 30 kph in the present embodiment although other ranges are also useful) the LSP control system 12 controls vehicle speed in accordance with the value of LSP_set-speed. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behaviour when slip is detected.

The LSP control HMI 20 is provided in the vehicle cabin so as to be readily accessible to the user. The user of the vehicle 100 is able to input to the LSP control system 12, via the LSP HMI 20, an indication of the speed at which the user desires the vehicle to travel (referred to as "the target speed") by means of the 'set-speed' button 173 and the '+'/'−' buttons 174, 175 in a similar manner to the cruise control system 16. The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20.

The HDC function block of the VCU 10 forms part of a HDC system 12HD. When the HDC system 12HD is active, the system 12HD controls the braking system 22 (of which the ABS function block forms part) in order to limit vehicle speed to a value corresponding to that of a HDC set-speed parameter HDC_set-speed which may be set by a user. The HDC set-speed may also be referred to as an HDC target speed. Provided the user does not override the HDC system by depressing the accelerator pedal when the HDC system is active, the HDC system 12HD controls the braking system 22 (FIG. 3) to prevent vehicle speed from exceeding the HDC_set-speed. In the present embodiment the HDC system 12HD is not operable to apply positive drive torque. Rather, the HDC system 12HD is only operable to apply negative brake torque.

A HDC system HMI 20HD is provided by means of which a user may control the HDC system 12HD, including setting the value of HDC_set-speed. An HDC system selector button 177 is provided on the steering wheel 171 by means of which a user may activate the HDC system 12HD to control vehicle speed.

As noted above, the HDC system 12HD is operable to allow a user to set a value of HDC set-speed parameter HDC_set-speed and to adjust the value of HDC_set-speed using the same controls as the cruise control system 16 and LSP control system 12. Thus, in the present embodiment, when the HDC system 12HD is controlling vehicle speed, the HDC system set-speed may be increased, decreased or set to an instant speed of the vehicle in a similar manner to the set-speed of the cruise control system 16 and LSP control system, using the same control buttons 173, 173R, 174, 175. The HDC system 12HD is operable to allow the value of HDC_set-speed to be set to any value in the range from 2-30 kph.

If the HDC system 12HD is selected when the vehicle 100 is travelling at a speed of 50 kph or less and no other speed control system is in operation, the HDC system 12HD sets the value of HDC_set-speed to a value selected from a look-up table. The value output by the look-up table is determined in dependence on the identity of the currently selected transmission gear, the currently selected PTU gear ratio (Hi/LO) and the currently selected driving mode. The HDC system 12HD then applies the powertrain 129 and/or braking system 22 to slow the vehicle 100 to the HDC system set-speed provided the driver does not override the HDC system 12HD by depressing the accelerator pedal 161. The HDC system 12HD is configured to slow the vehicle 100 to the set-speed value at a deceleration rate not exceeding a maximum allowable rate. The rate is set as 1.25 ms-2 in the present embodiment, however other values are also useful. If the user subsequently presses the 'set-speed' button 173 the HDC system 12HD sets the value of HDC_ set-speed to the instant vehicle speed provided the instant speed is 30 kph or less. If the HDC system 12HD is selected when the vehicle 100 is travelling at a speed exceeding 50 kph, the HDC system 12HD ignores the request and provides an indication to the user that the request has been ignored.

It is to be understood that the VCU 10 is configured to implement a known Terrain Response (TR)® System of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response modes, or control modes. In the embodiment of FIG. 1 four driving modes are provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain; a 'grass, gravel or snow' driving mode suitable for driving over grass, gravel or snow, a 'rock crawl' driving mode suitable for driving slowly over a rocky surface; and a 'mud and ruts' driving mode suitable for driving in muddy, rutted terrain. Other driving modes may be provided in addition or instead.

In some embodiments, the LSP control system 12 may be in either one of an active condition, a standby condition and an 'off' condition. In the active condition, the LSP control system 12 actively manages vehicle speed by controlling powertrain torque and braking system torque. In the standby condition, the LSP control system 12 does not control vehicle speed until a user presses the resume button 173R or the 'set speed' button 173. In the off condition the LSP control system 12 is not responsive to input controls until the LSP control system selector button 172 is depressed.

In the present embodiment the LSP control system 12 is also operable to assume an intermediate condition similar to that of the active mode but in which the LSP control system 12 is prevented from commanding the application of positive drive torque to one or more wheels of the vehicle 100 by the powertrain 129. Thus, only braking torque may be applied, by means of the braking system 22 and/or powertrain 129. Other arrangements are also useful.

With the LSP control system 12 in the active condition, the user may increase or decrease the vehicle set-speed by means of the '+' and '−' buttons 174, 175. In addition, the user may also increase or decrease the vehicle set-speed by lightly pressing the accelerator or brake pedals 161, 163 respectively. In some embodiments, with the LSP control system 12 in the active condition the '+' and '−' buttons 174, 175 are disabled such that adjustment of the value of LSP_set-speed can only be made by means of the accelerator and brake pedals 161, 163. This latter feature may prevent unintentional changes in set-speed from occurring, for example due to accidental pressing of one of the '+' or '−' buttons 174, 175. Accidental pressing may occur for example when negotiating difficult terrain where relatively large and frequent changes in steering angle may be required. Other arrangements are also useful.

It is to be understood that in the present embodiment the LSP control system 12 is operable to cause the vehicle to travel in accordance with a value of set-speed in the range from 2-30 kph whilst the cruise control system is operable to cause the vehicle to travel in accordance with a value of set-speed in the range from 25-150 kph although other values are also useful. If the LSP control system 12 is selected when the vehicle speed is above 30 kph but less than or substantially equal to 50 kph, the LSP control system 12 assumes the intermediate mode. In the intermediate mode, if the driver releases the accelerator pedal 161 whilst travelling above 30 kph the LSP control system 12 deploys the braking system 22 to slow the vehicle 100 to a value of set-speed corresponding to the value of parameter LSP_set-speed. Once the vehicle speed falls to 30 kph or below, the LSP control system 12 assumes the active condition in which it is operable to apply positive drive torque via the powertrain 129, as well as brake torque via the powertrain 129 (via engine braking) and the braking system 22 in order to control the vehicle in accordance with the LSP_set-speed value. If no LSP set-speed value has been set, the LSP control system 12 assumes the standby mode.

It is to be understood that if the LSP control system 12 is in the active mode, operation of the cruise control system 16 is inhibited. The two systems 12, 16 therefore operate independently of one another, so that only one can be operable at any one time, depending on the speed at which the vehicle is travelling.

In some embodiments, the cruise control HMI 18 and the LSP control HMI 20 may be configured within the same hardware so that, for example, the speed selection is input via the same hardware, with one or more separate switches being provided to switch between the LSP input and the cruise control input.

Figure 4:
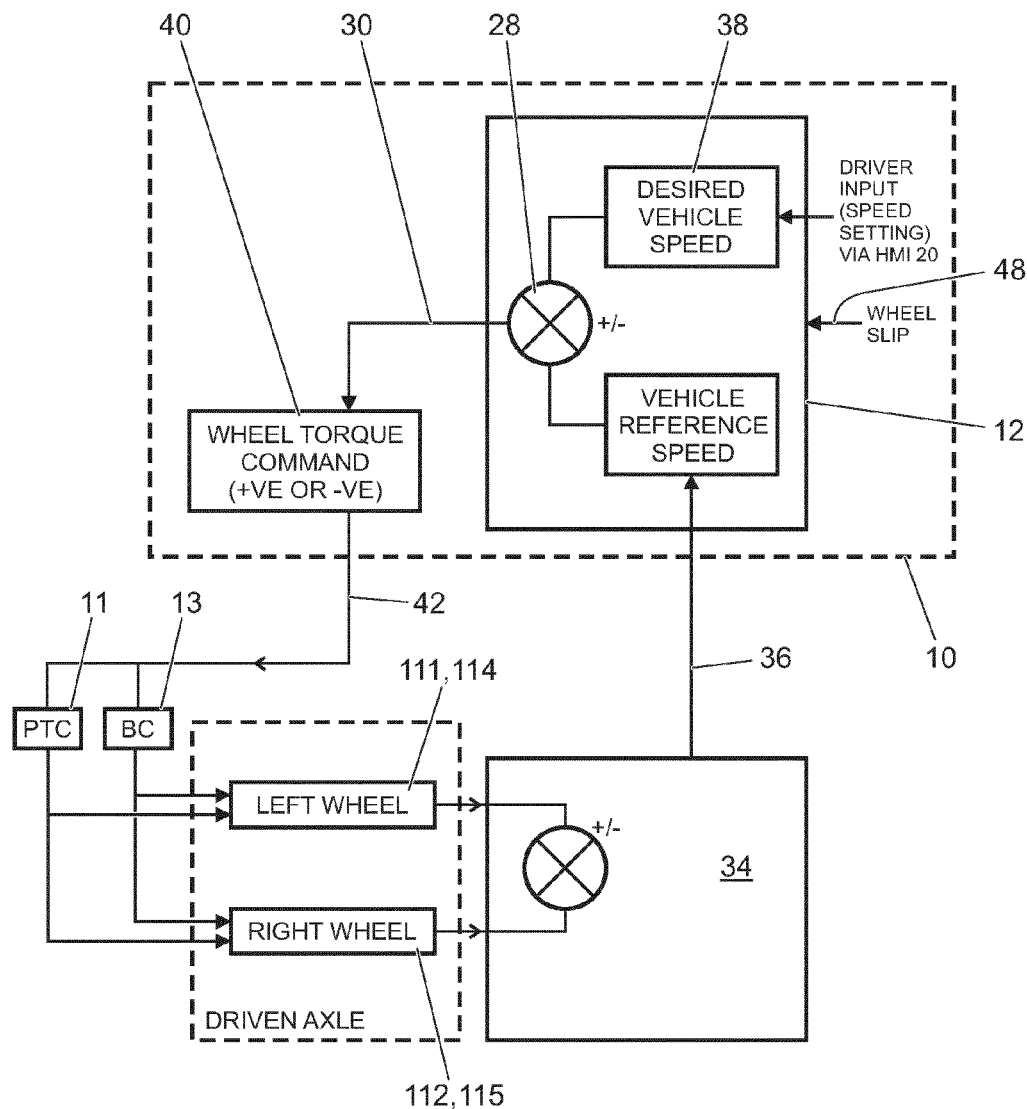
FIG. 4 is a schematic diagram of further features of the vehicle speed control system in FIG. 3.

FIG. 4 illustrates the means by which vehicle speed is controlled in the LSP control system 12. As described above, a speed selected by a user (set-speed) is input to the LSP control system 12 via the LSP control HMI 20. A vehicle speed sensor 34 associated with the powertrain 129 (shown in FIG. 1) provides a signal 36 indicative of vehicle speed to the LSP control system 12. The LSP control system 12 includes a comparator 28 which compares the set-speed 38 (also referred to as a 'target speed' 38) selected by the user with the measured speed 36 and provides an output signal 30 indicative of the comparison. The output signal 30 is provided to an evaluator unit 40 of the VCU 10 which interprets the output signal 30 as either a demand for additional torque to be applied to the vehicle wheels 111-115, or for a reduction in torque applied to the vehicle wheels 111-115, depending on whether the vehicle speed needs to be increased or decreased to maintain the speed LSP_set-speed. An increase in torque is generally accomplished by increasing the amount of powertrain torque delivered to a given position of the powertrain, for example an engine output shaft, a wheel or any other suitable location. A decrease in torque at a given wheel to a value that is less positive or more negative may be accomplished by decreasing powertrain torque delivered to a wheel and/or by increasing a braking force on a wheel. It is to be understood that in some embodiments in which a powertrain 129 has one or more electric machines operable as a generator, negative torque may be applied by the powertrain 129 to one or more wheels by the electric machine. Negative torque may also be applied by means of engine braking in some circumstances, depending at least in part on the speed at which the vehicle 100 is moving. If one or more electric machines are provided that are operable as propulsion motors, positive drive torque may be applied by means of the one or more electric machines.

An output 42 from the evaluator unit 40 is provided to the powertrain controller 11 and brake controller 13 which in turn control a net torque applied to the vehicle wheels 111-115. The net torque may be increased or decreased depending on whether the evaluator unit 40 demands positive or negative torque. In order to cause application of the necessary positive or negative torque to the wheels, the evaluator unit 40 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed. In the illustrated embodiment the torque is applied to the vehicle wheels individually so as to maintain the vehicle at the required speed, but in another embodiment torque may be applied to the wheels collectively to maintain the required speed. In some embodiments, the powertrain controller 11 may be operable to control an amount of torque applied to one or more wheels by controlling a driveline component such as a rear drive unit, front drive unit, differential or any other suitable component. For example, one or more components of the driveline 130 may include one or more clutches operable to allow an amount of torque applied to one or more wheels to be varied. Other arrangements are also useful.

Where a powertrain 129 includes one or more electric machines, for example one or more propulsion motors and/or generators, the powertrain controller 11 may be operable to modulate torque applied to one or more wheels by means of one or more electric machines.

The LSP control system 12 also receives a signal 48 indicative of a wheel slip event having occurred. This may be the same signal 48 that is supplied to the on-highway cruise control system 16 of the vehicle, and which in the case of the latter triggers an override or inhibit mode of operation in the on-highway cruise control system 16 so that automatic control of vehicle speed by the on-highway cruise control system 16 is suspended or cancelled. However, the LSP control system 12 is not arranged to cancel or suspend operation in dependence on receipt of a wheel slip signal 48 indicative of wheel slip. Rather, the system 12 is arranged to monitor and subsequently manage wheel slip so as to reduce driver workload. During a slip event, the LSP control system 12 continues to compare the measured vehicle speed with the value of LSP_set-speed, and continues to control automatically the torque applied to the vehicle wheels so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or speed control by the cruise control system 12 resumed by pressing the resume button 173R or set-speed button 173.

In a further embodiment of the present invention (not shown) a wheel slip signal 48 is derived not just from a comparison of wheel speeds, but further refined using sensor data indicative of the vehicle's speed over ground. Such a speed over ground determination may be made via global positioning (GPS) data, or via a vehicle mounted radar or laser based system arranged to determine the relative movement of the vehicle 100 and the ground over which it is travelling. A camera system may be employed for determining speed over ground in some embodiments.

At any stage of the LSP control process the user can override the function by depressing the accelerator pedal 161 and/or brake pedal 163 to adjust the vehicle speed in a positive or negative sense. However, in the event that a wheel slip event is detected via signal 48, the LSP control system 12 remains active and control of vehicle speed by the LSP control system 12 is not suspended. As shown in FIG. 4, this may be implemented by providing a wheel slip event signal 48 to the LSP control system 12 which is then managed by the LSP control system 12. In the embodiment shown in FIG. 1 the SCS 14 generates the wheel slip event signal 48 and supplies it to the LSP control system 12 and cruise control system 16.

A wheel slip event is triggered when a loss of traction occurs at any one of the vehicle wheels. Wheels and tyres may be more prone to losing traction when travelling for example on snow, ice, mud or sand and/or on steep gradients or cross-slopes. A vehicle 100 may also be more prone to losing traction in environments where the terrain is more uneven or slippery compared with driving on a highway in normal on-road conditions. Embodiments of the present invention therefore find particular benefit when the vehicle 100 is being driven in an off-road environment, or in conditions in which wheel slip may commonly occur. Manual operation in such conditions can be a difficult and often stressful experience for the driver and may result in an uncomfortable ride.

The vehicle 100 is also provided with additional sensors (not shown) which are representative of a variety of different parameters associated with vehicle motion and status. These may be inertial systems unique to the LSP or HDC control system 12, 12HD or part of an occupant restraint system or any other sub-system which may provide data from sensors such as gyros and/or accelerometers that may be indicative of vehicle body movement and may provide a useful input to the LSP and/or HDC control systems 12, 12HD. The signals from the sensors provide, or are used to calculate, a plurality of driving condition indicators (also referred to as terrain indicators) which are indicative of the nature of the terrain conditions over which the vehicle is travelling.

The sensors (not shown) on the vehicle 100 include, but are not limited to, sensors which provide continuous sensor outputs to the VCU 10, including wheel speed sensors, as mentioned previously and as shown in FIG. 5, an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14, a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used.

The VCU 10 also receives a signal from the steering controller 170C. The steering controller 170C is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

The VCU 10 evaluates the various sensor inputs to determine the probability that each of a plurality of different control modes (driving modes) for the vehicle subsystems is appropriate, with each control mode corresponding to a particular terrain type over which the vehicle is travelling (for example, mud and ruts, sand, grass/gravel/snow).

If the user has selected operation of the vehicle in an automatic driving mode selection condition, the VCU 10 then selects the most appropriate one of the control modes and is configured automatically to control the subsystems according to the selected mode. This aspect of the invention is described in further detail in our co-pending patent application nos. GB2492748, GB2492655 and GB2499279, the contents of each of which is incorporated herein by reference.

The nature of the terrain over which the vehicle is travelling (as determined by reference to the selected control mode) may also be utilised in the LSP control system 12 to determine an appropriate increase or decrease in drive torque that is to be applied to the vehicle wheels. For example, if the user selects a value of LSP_set-speed that is not suitable for the nature of the terrain over which the vehicle is travelling, the system 12 is operable to automatically adjust the vehicle speed downwards by reducing the speed of the vehicle wheels. In some cases, for example, the user selected speed may not be achievable or appropriate over certain terrain types, particularly in the case of uneven or rough surfaces. If the system 12 selects a set-speed that differs from the user-selected set-speed, a visual indication of the speed constraint is provided to the user via the LSP HMI 20 to indicate that an alternative speed has been adopted.

In the embodiment of FIG. 1 the transmission 124 may be set to one of a plurality of transmission operating modes, being a park mode, a reverse mode, a neutral mode, a drive mode or a sport mode, by means of a transmission mode selector dial 124S. The selector dial 124S provides an output signal to the powertrain controller 11 in response to which the powertrain controller 11 causes the transmission 124 to operate in accordance with the selected transmission mode.

The powertrain controller 11 is configured to monitor a speed of travel of the vehicle over terrain, and the direction in which the vehicle is travelling. If the powertrain controller 11 detects that a user has requested (by means of the selector dial 124S) a transmission mode corresponding to travel in a direction opposite a current (i.e. instant) direction of travel of the vehicle, the powertrain controller 11 is operable to command the transmission 124 to select (assume) the requested transmission mode only if the speed of the vehicle 100 is below a prescribed direction change speed limit value. The prescribed direction change speed limit value may depend on whether the vehicle is travelling in a forward or reverse direction in some embodiments. In some embodiments the powertrain controller 11 may be configured to require the vehicle 100 to be substantially stationary before permitting a transmission mode to be assumed that corresponds to travel in the opposite direction to that corresponding to the current transmission operating mode.

If the LSP control system 12 is causing the vehicle 100 to operate in accordance with a target speed value and the user sets the transmission selector dial 124S to a transmission mode corresponding to travel in a direction opposite the direction corresponding to the instant transmission mode, the LSP control system 12 is configured to determine whether the instant speed of the vehicle exceeds the prescribed direction change speed limit value for the instant direction of travel. If the instant vehicle speed does exceed this limit value, the LSP control system 12 causes the vehicle 100 to slow to a speed that is substantially equal to or less than the direction change speed limit value and then commands the powertrain controller 11 to cause the transmission 124 to assume the operating mode requested by the user via the selector dial 124S. In some embodiments the LSP control system 12 may be configured to cause the vehicle 100 to slow substantially to a standstill before commanding the powertrain controller 11 to cause the transmission 124 to assume the transmission operating mode requested by the user.

It is to be understood that the LSP control system 12 is operable to vary and control vehicle speed by management of net torque at individual wheels via appropriate control of both positive and negative torque applied to the wheel. Positive torque is applied by means of the powertrain 129 via powertrain controller 11 whilst negative torque is applied by means of the powertrain 129 and/or brakes, the brakes being applied under the control of the brake controller 13. It is to be understood that, whilst the transmission is transitioning from one operating mode to another, an interruption in powertrain torque delivery to one or more wheels may occur. The LSP control system 12 is configured to control vehicle speed during this period using application of brakes of the vehicle under the control of the brake controller 13. The system 12 may be configured to cause application of the braking system 22 to control vehicle speed to prevent vehicle speed from exceeding the direction change speed limit value whilst the direction change operation is in progress. Thus it is to be understood that the system 12 may be configured to ensure that vehicle speed does not exceed the direction change speed limit value until the direction change operation is complete.

It is to be understood that in situations where a vehicle 100 is operating on substantially level ground, speed control by application of brakes of a braking system 22 may be unnecessary or require only relatively light application of the brakes in order to prevent vehicle speed from exceeding the maximum allowable value during a direction change operation. However in situations where a vehicle 100 is negotiating sloping terrain, application of brakes may be critical in preventing the speed from becoming excessive.

For example, in a situation in which the vehicle 100 is descending a gradient when a direction change operation is required, the LSP control system 12 may be configured to cause a reduction in speed to a value at or below the direction change speed limit value Once the LSP control system 12 detects that the transmission 124 has assumed the operating mode requested by the user, the system 12 is configured to cause the vehicle 100 to operate in accordance with a target speed value for the instant (new) direction of travel. The LSP control system 12 is operable to store a target speed value for travel in a forward direction and a target speed value for travel in a reverse direction. When travelling in a given direction, the system 12 causes the vehicle to operate in accordance with the target speed value for the current direction of travel.

In some embodiments the LSP control system 12 may be configured to employ the braking system 22 to prevent rollback once a gear corresponding to travel in the opposite direction has been selected. That is, the system 12 may be configured to prevent movement of the vehicle 100 in the direction opposite that corresponding to the direction of travel of the newly selected gear until the vehicle 100 has commenced motion in the direction of the newly selected gear, i.e. the newly selected direction of travel.

In some embodiments the LSP control system 12 may be configured to cause the vehicle 100 to come to rest by means of the braking system 22 and subsequently to prevent continued movement in that direction, being a direction opposite the intended new direction of travel, by means of the braking system 22. The system may be configured to release brakes of the braking system 22 once sufficient torque is being applied to one or more wheels by the powertrain 129 and/or as a consequence of gravitational force to permit the vehicle 100 to move in the newly selected direction without experiencing rolling in the opposite direction.

Thus the system 12 may be configured to cause the vehicle 100 to come to rest and remain at rest until the direction change operation is complete, and sufficient torque is being applied to one or more wheels by the powertrain 129 and/or as a consequence of gravitational force to permit the vehicle 100 to move in the newly selected direction without experiencing rollback.

By way of example, in the case that the vehicle 100 is travelling uphill when a direction change operation is initiated, the system 12 may be configured to employ the braking system 22 to prevent vehicle speed exceeding the direction change speed limit value in the new (downhill) direction of travel whilst the direction change operation is in progress, if movement of the vehicle 100, for example under gravity, takes place in the newly selected direction before powertrain torque delivery to one or more wheels is restored with the transmission operating in the newly selected operating mode.

Thus in some embodiments the system 12 may employ the braking system 22 to prevent vehicle speed exceeding the prevailing target speed value in the new direction of travel. It is to be understood that, once the transmission 124 of the vehicle 100 is operating in a gear corresponding to the newly selected direction of travel, vehicle speed control may be performed by a combination of powertrain torque control and brake torque control. Thus the system 12 may be arranged to deploy the braking system 22 to control vehicle speed until the transmission 124 is operating in the newly selected gear, after which speed control may be performed by control of one or both of powertrain torque and brake torque.

In some embodiments, speed control by the LSP control system 12 may be suspended during a direction change operation and an alternate system employed to control vehicle speed by means of the braking system 22 alone. For example in some embodiment the HDC system 12HDC may be employed to control vehicle speed during this period.

Thus, once a direction change operation is initiated, control of vehicle speed by the LSP control system 12 may be suspended whilst the direction change operation is in progress, due to the fact that a powertrain torque interruption will typically occur when the selected transmission operating gear is changed from a forward gear to a reverse gear. During the period of suspension, vehicle speed may be controlled by means of the brake controller 13.

In some embodiments, in the case that the newly selected direction of travel is downhill, the brake controller 13, optionally under control of the HDC system 12HD, may be configured to control the braking system 22 to allow vehicle speed to accelerate under gravity up to the target speed value in the newly selected direction of travel. If the newly selected direction of travel is uphill, the controller 13 may control the braking system 22 to hold the vehicle 100 at a speed at or below the direction change speed limit value in the direction opposite the newly selected direction of travel, or alternatively substantially stationary, until sufficient powertrain torque has been developed to propel the vehicle in the newly selected direction of travel. Thus the braking system may be controlled so as to prevent excessive 'rollback' of the vehicle, i.e. rolling in the downhill direction opposite the newly selected direction of travel, whilst the direction change operation is in progress. It is to be understood that the LSP control system 12 may be configured to accelerate the vehicle by application of powertrain torque once application of powertrain torque to one or more wheels has been restored following the direction change operation.

It is to be understood that in some embodiments the LSP control system 12 may be configured to accelerate the vehicle 100 from a substantially stationary condition by means of powertrain torque and to control release of the braking system 22 to allow the vehicle 100 to progress in the newly selected (uphill) direction.

The system 12 may limit the speed at which the vehicle 100 may travel in dependence on the terrain over which the vehicle 100 is travelling, and the limit may be a value below the prevailing target speed value in some circumstances. The system 12 therefore causes the vehicle 100 to operate in accordance with the target speed value subject to any limitation imposed by the system 12 due to the terrain. Terrain may be defined with respect to surface gradient, surface roughness, surface type and/or selected terrain response (TR) mode.

In addition or instead, the system 12 may limit the speed at which the vehicle 100 may travel in dependence on steering angle and/or rate of change of steering angle in order to enhance composure, vehicle traction and stability. Steering angle and/or rate of change of steering angle may be determined by reference to an angular position of the steering wheel 171 in some embodiments.

If a target speed value for travel in one direction has not been set, the system 12 is operable to cause the vehicle to operate in accordance with the instant target speed value for travel in the opposite direction, if one has been set, subject to any limitation in allowable value. For example, in some embodiments the maximum allowable target speed value for travel in a reverse direction may be lower than that for travel in a forward direction. Similarly, the LSP control system 12 may be operable to cause the vehicle 100 to accelerate to a target speed value following an automatic change of direction of travel at a rate dependent on the instant (new) direction of travel.

Figure 6:
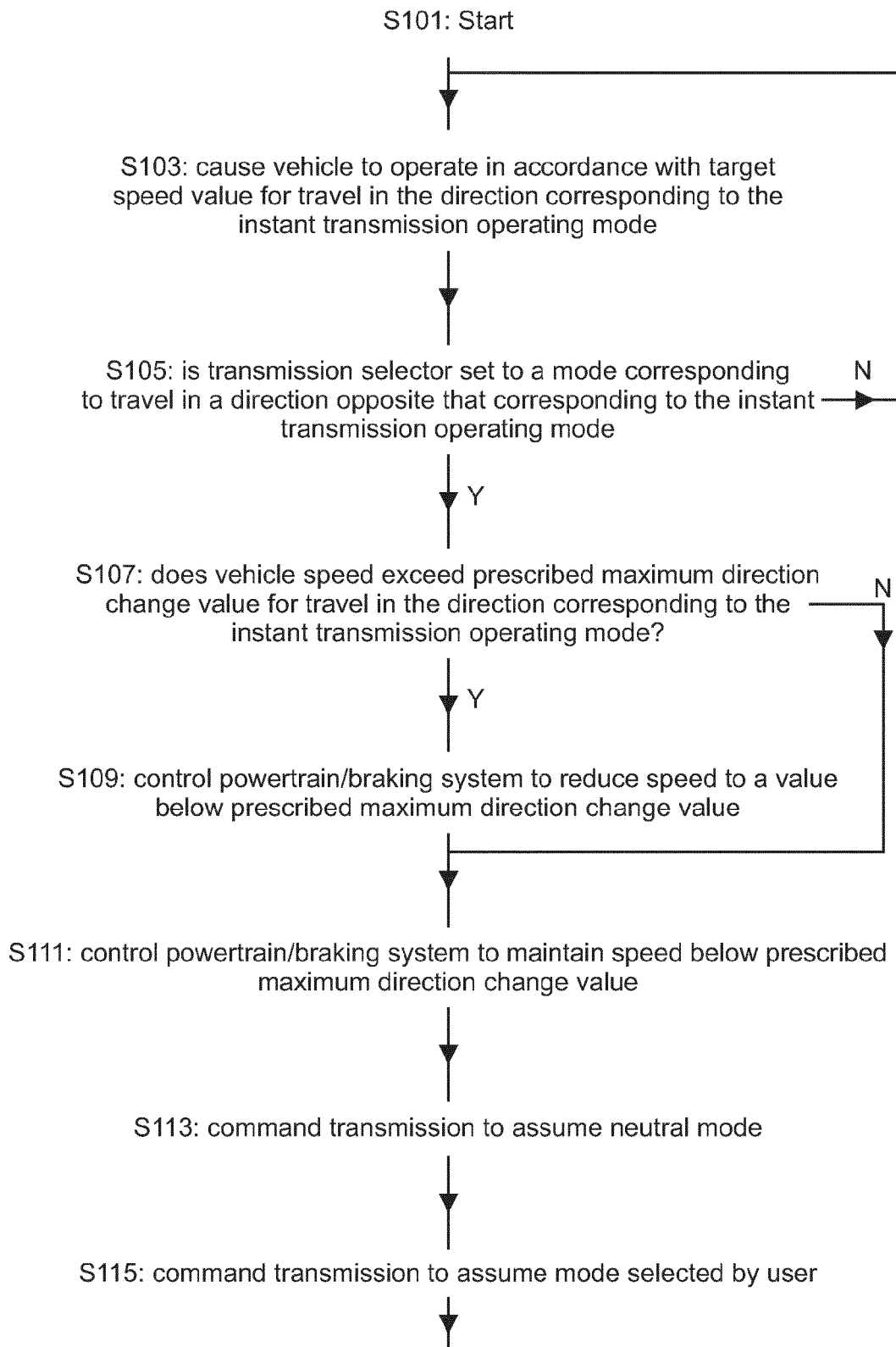
FIG. 6 is a flowchart illustrating operation of a vehicle according to an embodiment of the present invention.

FIG. 6 is a flowchart illustrating operation of a vehicle 100 according to an embodiment of the present invention when a user requests a change in direction of travel whilst travelling with vehicle speed controlled by the LSP control system 12.

At step S101 the LSP control system 12 commences execution of software code according to an embodiment of the present invention.

At step S103 the LSP control system 12 causes the vehicle 100 to operate in accordance with a target speed value for travel in the direction corresponding to the instant transmission operating mode in which the transmission 124 is operating. Thus, if the transmission 124 is operating in a mode corresponding to travel in the forward direction, the LSP control system 12 causes the vehicle 100 to operate in accordance with a target speed value for travel in the forward direction whilst if the transmission 124 is operating in a mode corresponding to travel in the reverse direction, the LSP control system 12 causes the vehicle to operate in accordance with a target speed value for travel in the reverse direction.

At step S105 the LSP control system 12 checks whether the transmission mode selector dial 124S is set to a transmission mode corresponding to travel in a direction opposite that of the instant transmission operating mode. If this is true, the LSP control system 12 continues at step S107 else the system 12 continues at step S103. Thus, if the transmission 124 is operating in a mode corresponding to travel in the forward direction, such as drive mode 'D', but the transmission mode selector dial 124S is set to the reverse mode 'R', or vice versa, the system continues at step S107.

At step S107 the LSP control system 12 checks whether vehicle speed exceeds the prescribed maximum direction change value for travel in the direction corresponding to the instant mode in which the transmission 124 is operating, i.e. the actual mode in which the transmission 124 is operating and not the newly selected mode. If this is true, the LSP control system 12 continues at step S109 else the system 12 continues at step S111. It is to be understood that the system 12 does not permit the transmission operating mode to be changed whilst the vehicle 100 is travelling at a speed exceeding the direction change speed limit value.

At step S109 the LSP control system 12 commands the brake controller 13 and/or powertrain controller 11 to cause a reduction in vehicle speed to a value at or below the prescribed maximum direction change value.

In some embodiments the system 12 is configured to reduce vehicle speed substantially to zero before allowing the transmission to change operating mode.

It is to be understood that in some embodiments the system 12 may be configured to decelerate the vehicle to a speed not exceeding the direction change speed limit value, and optionally substantially to zero, at a rate that is determined in dependence on at least one of selected TR mode, instant direction of travel and instant steering angle. The system 12 may be operable subsequently to accelerate the vehicle 100 back to the target speed at a rate selected in dependence on at least one selected from amongst TR mode, gradient, vehicle load condition and surface coefficient of friction. Accelerating the vehicle may be performed when the system 12 transitions from step S115 to step S103.

At step S111 the LSP control system 12 causes vehicle speed to remain at or below the maximum direction change value by issuing commands to the brake controller 13 and/or powertrain controller 11. In some embodiments the system 12 causes the vehicle 100 to remain substantially stationary.

At step S113 the LSP control system 12 commands the powertrain controller 11 to cause the transmission 124 to assume the neutral mode. Whilst in the neutral mode, the LSP control system 12 commands the brake controller 13 to apply the braking system 22 as required in order to prevent vehicle speed from exceeding the direction change speed limit value. In some embodiments the LSP control system 12 assumes a 'descent control' mode in which the LSP control system 12 causes the vehicle 100 not to exceed the direction change speed limit value by commanding brake controller 13 to apply the braking system 22 as required. Whilst in the descent control mode, the LSP control system 12 suspends commanding the powertrain controller 11 to provide positive drive torque by means of engine 121.

In some embodiments the LSP control system 12 is configured to operate as if the HDC control system 12HD were controlling vehicle speed not to exceed the HDC set-speed parameter HDC_set-speed. In some embodiments, the LSP control system 12 may set the value of HDC_set-speed to a value not exceeding the direction change speed limit value, optionally to a value substantially equal to the direction change speed limit value, and hand over vehicle speed control to the HDC control system 12HD whilst the transmission 124 is in the neutral mode. Once the transmission 124 has assumed the required mode according to the setting of the transmission mode selector dial 124S, the LSP control system 12 then resumes control of vehicle speed in accordance with the LSP_set-speed value for the new direction of travel. The LSP control system 12 therefore causes the vehicle 100 to accelerate to the new set-speed subject to any temporary reduction in maximum allowable vehicle speed whilst under the control of the LSP control system 12, for example due to the type of the prevailing terrain.

It is to be understood that with vehicles equipped with some types of transmission, such as dual clutch transmissions, step S113 may be negated since the next gear selection to drive the vehicle in the opposite direction may already be pre-selected. Thus the move from step S111 to S115 may be made by selective operation of a system of transmission clutches. Other arrangements are also useful.

At step S115 the LSP control system 12 commands the powertrain controller 11 to cause the transmission 124 to assume an operating mode corresponding to that requested by the user via the transmission selector dial 124S. The system 12 and/or powertrain controller 11 may be configured to command opening and closing of one or more clutches associated with a driveline of the vehicle including the transmission 124 as part of the process of assuming the new operating mode.

Once the transmission 124 has assumed the new operating mode, the LSP control system 12 continues at step S103.

In some embodiments, at step S113 the LSP control system 12 is operable to command the powertrain controller 11 to cause the transmission operating mode to change to the mode corresponding to that requested by the user via the transmission selector dial 124S, the powertrain controller 11 being configured to cause the transmission 124 to assume the neutral mode if required, and subsequently the transmission operating mode requested by the user. The LSP control system 12 may wait for confirmation from the powertrain controller 11 that the transmission 124 is in the operating mode requested by the user before causing the vehicle to operate in accordance with a target speed for travel in the new direction.

Alternatively, at step S113 the LSP control system 12 may command a dedicated transmission controller to change the mode of operation of the transmission 124 to the required mode directly. For vehicles with particularly complex transmissions this option may be less preferred due to the additional computational overhead associated with control of the transmission 124 by the LSP control system 12. However, this feature may be particularly useful in systems in which relatively rapid switching of powertrain operating mode may be required.

It is to be understood that in some embodiments the LSP control system 12 may be operable to command a change in transmission operating mode, directly to a transmission controller or indirectly via the powertrain controller 11, whereby the command is executed only if one or more predetermined conditions are met, the transmission controller or powertrain controller 11 being configured to determine whether the conditions are met. The conditions may include for example a requirement that vehicle speed is below a predetermined value, such as the direction change speed limit value. Alternatively, the transmission controller or powertrain controller 11 may be configured to execute the command regardless of whether the one or more predetermined conditions are met.

Figure 7:
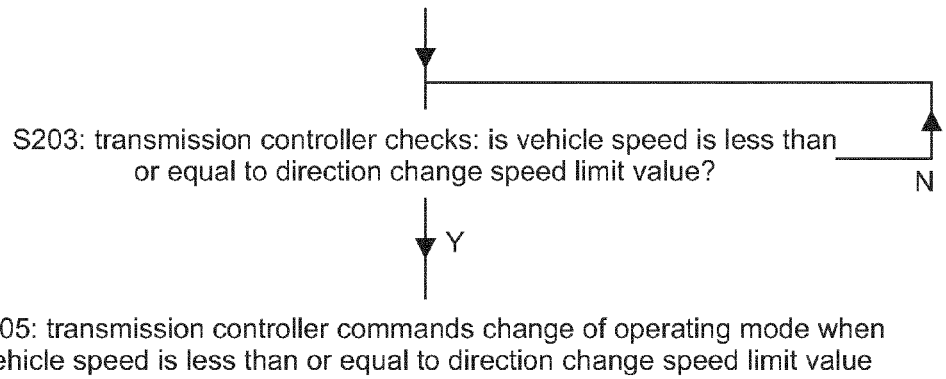
FIG. 7 is a flowchart illustrating (a) a prior art method of operation of a vehicle and (b) a method of operation of a vehicle according to an embodiment of the present invention.
Figure 7:
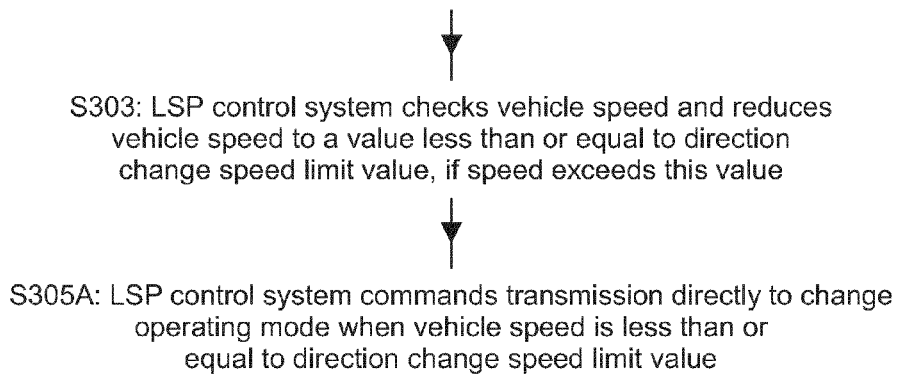

FIG. 7 illustrates (a) a method of reversing a direction of travel of a known vehicle and (b) a method of reversing a direction of travel of a vehicle according to an embodiment of the present invention.

In the diagram of FIG. 7(*a*), at step S201 a user selects a transmission operating mode corresponding to travel in the opposite direction to the instant transmission operating mode. At step S203 a transmission controller of the vehicle checks whether vehicle speed is less than or equal to a direction change speed limit value. If at step S203 the speed is less than or equal to this limit value then at step S205 the transmission controller commands the change of operating mode selected by the user. It is to be understood that, in such known arrangements, the user is responsible for reducing vehicle speed by means of the brake pedal 163 or other means in order to enable the transmission to change operating mode.

In the diagram of FIG. 7(*b*), at step S301 a user selects a transmission operating mode corresponding to travel in the opposite direction to the instant direction, via selector 124S. At step S303 LSP control system 12 checks vehicle speed. If vehicle speed exceeds the direction change speed limit value, the LSP control system 12 reduces the vehicle speed to a value less than or equal to the direction change speed limit value.

In one embodiment, at step S305A the LSP control system 12 checks that vehicle speed is less than or equal to the direction change speed limit value and then issues directly a command to the transmission 124 to change operating mode. The command may be received and actioned by a transmission controller (not shown).

In an alternative embodiment, instead of executing step S305A, step S305B is executed. At step S305B the transmission controller automatically changes operating in mode in response to user selection when the vehicle speed is less than or equal to the direction change speed limit value. Thus, the transmission controller (and/or in some embodiments the powertrain controller 11) monitors the state of the transmission operating mode selector dial 124S and vehicle speed independently of the LSP control system 12. If a change in operating mode is requested, the transmission controller or powertrain controller confirms that vehicle speed is less than or equal to the direction change speed limit value and then causes the change in operating mode to take place.

In a still further embodiment of the invention, step S305C is executed. At step S305C the LSP control system 12 commands a transmission controller to change transmission operating mode whilst the LSP control system 12 is reducing speed to a value less than or equal to the direction change speed limit value. In some embodiments, the LSP control system 12 may command the transmission 124 to assume the neutral mode whilst the LSP control system 12 executes a process of reducing vehicle speed to a value that does not exceed the direction change speed limit value. Once vehicle speed has fallen to a value not exceeding the direction change speed limit value the LSP control system 12 may command the transmission controller to assume the operating mode corresponding to the mode selected via selector 124S. This embodiment has the advantage that a time taken to perform a direction change operation may be reduced. This may be useful where repeated changes in direction in relatively rapid succession are required, as described below.

It is to be understood that embodiments of the present invention may be useful in reducing driver workload when the driver wishes to change a direction of travel of the vehicle when travelling with the LSP control system 12 active.

Embodiments of the invention may be particularly useful where frequent changes in direction are required, for example when performing a 'rock away' manoeuvre when the vehicle 100 is encountering difficulty climbing out of a depression in terrain, such as a pothole. In some situations the vehicle 100 may by unable to obtain sufficient grip or traction of the driving surface to climb out of the pothole directly from rest. In order to extract the vehicle, the driver may 'rock' the vehicle 100 by moving forwards and backwards repeatedly in rapid succession until sufficient momentum is gained in one direction of travel for the vehicle 100 to climb out of the pothole.

In some embodiments, the LSP control system 12 may be operable to implement a 'rock away' operation in which the system 12 automatically causes the vehicle 100 repeatedly to move in opposite directions until the vehicle 100 climbs out of the pothole. The rock-away operation may be initiated by means of a user operated selector in some embodiments.

In one embodiment, when a rock away operation is underway the LSP control system 12 may monitor vehicle speed, acceleration, wheel speed, wheel drag, road roughness, wheel articulation and/or net wheel torque in combination with vehicle attitude in order to predict whether the vehicle 100 is likely to be able to climb out of the pothole during movement in a forward or reverse direction. The LSP control system 12 may be configured to detect cresting in order to determine whether the vehicle 100 has made sufficient progress in a given direction to enable the vehicle to climb out of the pothole. It is to be understood that by the term cresting is meant a change in attitude of the vehicle 100 from a pitch-up attitude towards a level attitude with respect to a direction of travel of the vehicle as the vehicle negotiates a crest at the top of an incline. Thus if a vehicle crests whilst travelling in a forward direction a front portion of the vehicle may change from a pitch-up attitude towards a level attitude whilst if the vehicle crests whilst reversing the rear portion of the vehicle may change from a pitch-up attitude towards a level attitude. It is to be understood that cresting does not necessarily require that the vehicle achieve a level attitude since a pothole may be encountered whilst a vehicle up or down an incline. Cresting may occur as leading wheels exit the pothole and begin to roll over relatively flat ground that may be level or inclined as noted above. Cresting may be detected by means of a gyroscopic sensor or other sensor operable to detect and/or monitor changes in vehicle attitude and/or absolute vehicle attitude and/or changes in powertrain loading.

In some embodiments, the LSP control system 12 monitors speed and acceleration of the vehicle 100 in combination with attitude, for a given net drive torque applied to driven wheels of the vehicle, and estimates whether the vehicle 100 is likely to be able to climb out of the pothole on a given attempt. If it is determined that the vehicle 100 may be unable to climb out of the pothole, the system 12 may be configured automatically to reverse a direction of travel of the vehicle 100 and continue to seek to extract the vehicle from the pothole.

In some embodiments the LSP control system 12 may be operable to cause the vehicle to execute a prescribed number of movements in opposite directions before terminating a rock away manoeuvre. The system 12 may be operable to abort a rock-away manoeuvre if one or more conditions are met. For example if a driver depresses the brake pedal 163 or selects a transmission operating mode other than that selected automatically by the LSP control system 12 the system may cancel the rock-away manoeuvre. Other arrangements are also useful.

In some embodiments the LSP control system 12 may be arranged to provide advice to a driver in respect of the best way to negotiate a prevailing obstacle. The advice may be provided for example via LSP HMI 20. For example, the system 12 may provide advice to the driver as to a required or advisable position of one or more of accelerator pedal 161, transmission operating mode selector 124S and high/low (or Hi/Lo) ratio setting of PTU 131P, in order to negotiate the obstacle. In the case of a rock away manoeuvre the obstacle may be a pot-hole or other obstacle the vehicle 100 may be required to overcome.

In some embodiments the LSP control system 12 may be operable automatically to configure a transmission 124 of the vehicle 100 for travel in a forward direction when a first control signal is received and a second direction when a second control signal is received, the first and second control signals being triggered by one or more user operable controls other than the transmission operating mode selector 124S.

In some embodiments the vehicle 100 may be provided with first and second monostable paddle input controls operable to cause the transmission 124 to switch to a lower gear by means of the first paddle input control and a higher gear by means of the second paddle input control in a known manner. The vehicle 100 may be operable in a 'manoeuvre' mode whilst under the control of the LSP control system 12 in which the first and second paddles do not cause the transmission 124 to switch to higher or lower gears. Rather, operation of the first paddle input control causes the transmission 124 to assume an operating mode corresponding to travel in a reverse direction whilst operation of the second paddle input control is operable to cause the transmission 124 to assume an operating mode corresponding to travel in a forward direction (or vice versa). The paddles may be arranged for manual operation by a user, typically by pulling on the paddles but alternatively by pressing on the paddles. The paddles may be mounted to a steering wheel 171, a steering column (not shown), a dashboard (not shown), a centre console (not shown) or any other suitable location. In some embodiments, a change of operating mode of the transmission 124 to travel in an opposite direction may be triggered by means of an alternate monostable or bistable control, for example a multifunction control such as a joystick or a rocker switch. In some embodiments, in addition or instead a change of direction may be triggered by operation of a single paddle or other single control, such that the transmission toggles between forward and reverse directions each time the control is operated.

The feature that a monostable or bistable control may be used to trigger a change in transmission operating mode has the advantage that driver workload may be reduced. This is because rather than manipulating a multistable transmission operating mode selector 124S from a mode corresponding to travel in one direction to a mode corresponding to travel in the opposite direction, and ensuring that the correct mode is selected, in some embodiments the user simply operates a single monostable or bistable control in a single operation (which may be a single push, pull or twist operation) to cause the required transmission operating mode to be selected. Thus the user does not have to worry about pushing, pulling or twisting the control through too great or too little an amount as in the case of known transmission selectors. In the case of known transmission selectors, moving the selector an insufficient or excessive amount may result in failure to select a mode for travel in the opposite direction. For example, in some embodiments, if a user attempts to select the reverse operating mode from the forward drive operating mode, and turns the selector 124S by an insufficient amount, the transmission 124 may assume the neutral operating mode. If the user turns the selector 124S through too great an amount, the transmission 124 may assume the park mode. Other arrangements are also useful.

In some embodiments the manoeuvre mode may be selectable even if the LSP control system 12 is not actively controlling vehicle speed.

The powertrain controller 11 may be operable to allow a change of operating mode of the transmission 124 only if vehicle speed is less than a threshold value, regardless of whether the LSP control system 12 is active. In some embodiments, when the LSP control system 12 is not active the user may be required to cause vehicle speed to fall below the threshold value, for example by depressing brake pedal 163, in order to allow the transmission operating mode to be changed. Alternatively, in some embodiments, if the LSP control system 12 is not active and the user selects the manoeuvre mode, the LSP control system 12 may assume a mode in which, when it is determined that the driver requires to change direction, the LSP control system 12 executes a direction change operation in which it slows the vehicle to a speed sufficiently low to enable the transmission 124 to change operating mode.

In some embodiments, the manoeuvre mode may be selectable by means of a corresponding selector and referred to as a 'manoeuvre', 'rockaway' or like mode. When in the manoeuvre mode the vehicle 100 may be arranged to change a configuration of one or more other vehicle systems such as a camera system, side-mounted exterior rear view mirrors, or any other required system. For example, in some embodiments the vehicle 100 may be arranged such that when the manoeuvre mode is selected the camera system displays an image from a rearward facing camera. Optionally, in addition or instead, one or more side-mounted exterior rear view mirrors may be tilted so as to enable a driver to observe a driving surface immediately to the side of the vehicle, and optionally to see at least a portion of a wheel of the vehicle and the surface on which the wheel is resting. This allows the driver conveniently to verify directly progress of the vehicle 100 over terrain and to determine when a wheel has cleared an obstacle such as a pothole, boulder or the like.

The vehicle 100 may be configured such that operation in the manoeuvre mode terminates automatically when vehicle speed exceeds a prescribed threshold. Alternatively or in addition, the vehicle may be configured such that operation in the manoeuvre mode terminates automatically if a direction change operation is not performed for a prescribed period of time. The prescribed period may be any suitable period such as 30 s, 60 s, 90 s or any other suitable period.

In some embodiments, when the LSP control system 12 is in the manoeuvre mode, the LSP control system 12 may be operable to cause the transmission selector 124S to assume an operating characteristic in which the selector 124S is only operable to cause the transmission 124 to assume an operating mode corresponding to travel in forward or reverse directions. In some alternative embodiments the operating characteristic may be such that the selector 124S is only operable to cause the transmission 124 to assume an operating mode corresponding to travel in a forward direction, reverse direction or a neutral mode. Thus in the case of a vehicle 100 having a rotary selector 124S, in some embodiments if the manoeuvre mode is selected and the transmission 124 is in the drive mode, turning of the selector 124S in an anticlockwise direction through one detent may cause the transmission 124S to assume the neutral mode. Continued turning through a second detent may cause the transmission 124S to assume the reverse mode. It is to be understood that further turning in the same direction does not cause any further change in driving mode because the vehicle is the manoeuvre mode. If the system 12 were not in the manoeuvre mode, further turning would cause the transmission 124 to assume the 'park' or 'P' mode in some embodiments.

In some alternative embodiments the system 12 may be configured wherein if the transmission 124 is in the drive mode, the transmission 124 assumes the reverse mode upon turning the selector 124 anticlockwise through a single detent, with further turning in the anticlockwise direction not causing any further change in transmission operating mode.

Similarly, in some embodiments if the transmission 124 is in the reverse mode, turning of the selector 124S in a clockwise direction through one detent may cause the transmission 124S to assume the neutral mode, with continued turning through a second detent causing the transmission 124S to assume the drive mode. Alternatively, the transmission 124 may assume the drive mode upon turning the selector 124 in a clockwise direction from the reverse mode through a single detent.

The arrangement described may be referred to as an 'electronic stop' arrangement since the control system 12 causes the transmission 124 to be operated as if a mechanical stop were present to prevent a user from turning the selector 124S in clockwise or anticlockwise directions beyond positions corresponding to travel in forward and/or reverse directions. Thus, if a user is negotiating difficult terrain and has experiences difficulty manipulating the transmission selector 124S in a precise manner, the user may simply rotate the selector 124S by an amount more than sufficient to select travel in the opposite direction, confident that the transmission 124 will assume the desired mode and not an undesirable mode such as the park mode.

In some embodiments, when the vehicle is in the manoeuvre mode the LSP control system 12 may be operable to trigger a direction change operation in dependence on the detection of an obstacle by means of one or more sensors such as parking distance (PD) sensors and/or sensors associated with one or more other systems such as intelligent emergency braking (IEB) sensors. The sensors may for example be ultrasonic-based sensors, optical sensors such as infrared sensors or radar-based sensors.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A vehicle speed control system operable to cause a vehicle to operate in accordance with a target speed value, the system being operable automatically to:
   perform a direction change operation wherein the system causes a speed of the vehicle to reduce to a value not exceeding a direction change speed limit value, being a maximum speed at which a transmission of the vehicle is permitted to adopt a configuration corresponding to travel in an opposite direction to an instant configuration, if the vehicle speed exceeds the direction change speed limit value when the direction change operation is commenced;
   to cause a transmission of the vehicle to adopt a configuration corresponding to travel in the opposite direction to the instant configuration when the speed has reduced to a value not exceeding the direction change speed limit value, and
   accelerate the vehicle from rest following a change in configuration of the transmission from travel in a first direction to travel in a second direction opposite the first at a moment selected in dependence on suspension system articulation.

2. A system according to claim 1 operable automatically to cause the vehicle to operate in accordance with a target speed value following a direction change operation.

3. A system according to claim 1 operable to cause the vehicle to operate in accordance with a forward direction target speed value when travelling in a forward direction and a reverse direction target speed value when travelling in a reverse direction opposite the forward direction.

4. A system according to claim 3 wherein the forward direction target speed value is substantially equal to the reverse direction target speed value.

5. A system according to claim 3 operable to limit the value of the reverse direction target speed value to a maximum reverse direction target speed value.

6. A system according to claim 1 operable to perform the direction change operation in response to user selection of a transmission mode corresponding to travel in an opposite direction.

7. A system according to claim 1 operable to accelerate the vehicle from rest following a change in configuration of the transmission from travel in a first direction to travel in a second direction opposite the first when the suspension system of a newly trailing axle is in a configuration corresponding substantially to a maximum excursion of a body of the vehicle in a downward direction prior to acceleration from rest.

8. A system according to claim 1 operable to perform a rock-away operation in which the system causes the vehicle repeatedly to perform the direction change operation.

9. A system according to claim 8 wherein when the system is performing said rock-away operation, the system is operable automatically to perform a direction change operation in response to detection of a step in a driving surface.

10. A system according to claim 1 operable to allow a user to command execution of a direction change operation by selecting a transmission operating mode corresponding to travel in an opposite direction to that of the instant transmission operating mode.

11. A system according to claim 1 configured to apply a braking system to control vehicle speed while the direction change operation is in progress.

12. A system according to claim 11 configured to apply a braking system to control vehicle speed to prevent vehicle speed from exceeding the direction change speed limit value whilst the direction change operation is in progress.

13. A system according to claim 1 configured to employ a braking system to prevent rollback once a gear corresponding to travel in the opposite direction has been selected.

14. A system according to claim 13 configured to cause the vehicle to come to rest by means of the braking system and subsequently to prevent rolling in a direction opposite the intended new direction of travel, by means of the braking system, when a direction change operation is performed.

15. A system according to claim 14 configured to release the braking system once sufficient torque is being applied to one or more wheels by a powertrain and/or as a consequence of gravitation force to permit the vehicle to move in the newly selected direction without experiencing rolling in the opposite direction.

16. A vehicle comprising a system according to claim 1.

17. A method of controlling a vehicle by means of a speed control system, comprising:
    causing a vehicle to operate in accordance with a target speed value; and
automatically performing a direction change operation, whereby performing the direction change operation comprises causing a speed of the vehicle to reduce to a value not exceeding a direction change speed limit value, being a maximum speed at which a transmission of the vehicle is permitted to adopt a configuration corresponding to travel in an opposite direction to an instant configuration, if the vehicle speed exceeds the direction change speed limit value when the direction change operation is commenced;
    performing the direction change operation further comprises causing a transmission of the vehicle to adopt a configuration corresponding to travel in an opposite direction to the instant configuration when the vehicle speed does not exceed the direction change speed limit value; and
    accelerating the vehicle from rest following a change in configuration of the transmission from travel in a first direction to travel in a second direction opposite the first at a moment selected in dependence on suspension system articulation.

18. A method according to claim 17 comprising applying a braking system to control vehicle speed whilst the direction change operation is in progress.

19. A method according to claim 18 comprising applying a braking system to control vehicle speed to prevent vehicle speed from exceeding the direction change speed limit value whilst the direction change operation is in progress.

20. A method according to claim 17 comprising employing a braking system to prevent rollback once a gear corresponding to travel in the opposite direction has been selected.

21. A method according to claim 20 comprising causing the vehicle to come to rest by means of the braking system and subsequently preventing rolling in a direction opposite the intended new direction of travel, by means of the braking system, when a direction change operation is performed.

22. A method according to claim 21 comprising releasing the braking system once sufficient torque is being applied to one or more wheels by a powertrain and/or as a consequence of gravitation force to permit the vehicle to move in the newly selected direction without experiencing rolling in the opposite direction.

23. An electronic controller for a vehicle having a storage medium associated therewith storing instructions that when executed by the controller causes the control of the operation of a brake system of a vehicle in accordance with the method of claim 17.

24. A non-transitory, computer-readable storage medium storing instructions thereon that when executed by one or more electronic processors causes the one or more electronic processors to carry out the method of claim 17.

* * * * *